(12) United States Patent
Li et al.

(10) Patent No.: US 9,945,969 B2
(45) Date of Patent: Apr. 17, 2018

(54) APPARATUS AND METHOD FOR RECONSTRUCTING COMPLEX SALT GEOMETRY USING DUAL-FLOOD RTM WITH PRISMATIC WAVES

(75) Inventors: Yunfeng Li, Sugar Land, TX (US); Yogesh Agnihotri, Katy, TX (US); Timmy Dy, Houston, TX (US)

(73) Assignee: CGG SERVICES SAS, Massy (FR)

( * ) Notice: Subject to any disclaimer, the term of this patent is extended or adjusted under 35 U.S.C. 154(b) by 1333 days.

(21) Appl. No.: 13/606,849

(22) Filed: Sep. 7, 2012

(65) Prior Publication Data

US 2014/0071791 A1 Mar. 13, 2014

(51) Int. Cl.
*G01V 1/28* (2006.01)
*G01V 1/30* (2006.01)

(52) U.S. Cl.
CPC .............. *G01V 1/282* (2013.01); *G01V 1/302* (2013.01); *G01V 2210/679* (2013.01)

(58) Field of Classification Search
CPC .............. G06G 7/48; G01V 1/28; G01V 1/00
USPC .......... 367/51, 38, 37, 53, 57; 703/5; 702/14
See application file for complete search history.

(56) References Cited

U.S. PATENT DOCUMENTS

| 2009/0234622 A1 | 9/2009 | Sengupta et al. |
| 2011/0228638 A1 | 9/2011 | Roberts et al. |
| 2012/0026833 A1 | 2/2012 | Soubaras et al. |
| 2012/0051182 A1 | 3/2012 | Shin |

FOREIGN PATENT DOCUMENTS

| WO | 2011/053327 A1 | 5/2011 |
| WO | 2011-1141440 A1 | 11/2011 |

OTHER PUBLICATIONS

Farmer; Application of reverse time migration to complex imaging problems; first break vol. 24, Sep. 2006 EAGE; pp. 65-73.*
Silva; Integration of Borehole and Seismic Data to Unravel Complex Stratigraphy: Case Studies From The Mannville Group, Western Canada; Department of Earth and Planetary Sciences McGill University, Montreal Feb. 2009. 245 pages.*
Hart; 3•D Seismic Interpretation: A Primer ,for Geologists; 2000; SEPM Short Course No. 48; ISBN 1-56576-073-5.*
Denes; The role of reverse time migration in complex imaging CSEG Recorder | Jun. 2009 | vol. 34 No. 06.*
John E. Anderson et al., "Finding the Edge of Salt Via a Dual-Velocity Flood"; SEG/ Houston annual meeting, Nov. 6-11, 2005, pp. 1974-1977 and edited reference page.
Yu Zhang et al., "Practical issues in verse time migration: true amplitude gathers, noise removal and harmonic source encoding"; EAGE, First Break, vol. 27, Jan. 2009, pp. 53-59.

(Continued)

*Primary Examiner* — Isam A Alsomiri
*Assistant Examiner* — Amie M Ndure
(74) *Attorney, Agent, or Firm* — Patent Portfolio Builders PLLC

(57) ABSTRACT

A method, an apparatus and a computer-readable medium for processing seismic data are provided. The method includes selecting well-imaged areas of a sediment-to-salt interface, and performing (1) a dual-flood RTM with prismatic waves to identify new areas of the sediment-to-salt interface, and (2) one or more RTM to identify other new areas of the sediment-to-salt interface or of a salt-to-sediment interface.

20 Claims, 9 Drawing Sheets

(56) References Cited

OTHER PUBLICATIONS

Elive Menyoli., Complex 3-D Velocity-depth Model with RTM from top-to-down; SEG/Houston annual meeting, Oct. 25-30, 2005, pp. 3685-3689.
Yunfeng Li, "Prismatic Wave Imaging with Dual Flood RTM"; SEG/ San Antonio annual meeting, Sep. 18-23, 2011. [ages 2390-3294.
Examination and Search Report in corresponding Singapore Application No. 2013067301 dated Nov. 14, 2015.
Office Action in corresponding Mexican Application No. 2013/010265, dated Jan. 19, 2016. (Reference D2 cited in the Office Action has already been made of record to the USPTO).
Office Action is corresponding Australian Application No. 2013224699, dated Sep. 21, 2016. (Reference D2, US 2009/0234622 A1, submitted in an Information Disclosure Statement dated Mar. 3, 2016.).
P. Farmer, et al.; "Application of reverse time migration to complex imaging problems"; 2006 EAGE, special topic fb, Data Processing; first break vol. 24, Sep. 2006; pp. 65-73.

* cited by examiner

APPARATUS AND METHOD FOR RECONSTRUCTING COMPLEX SALT GEOMETRY USING DUAL-FLOOD RTM WITH PRISMATIC WAVES

TECHNICAL FIELD

Embodiments of the subject matter disclosed herein generally relate to apparatuses and methods for reconstructing a complex three-dimensional shape (top and bottom) of salt using dual reverse-time migration (RTM) with prismatic waves.

DISCUSSION OF THE BACKGROUND

In the Gulf of Mexico (GOM) (and in other locations around the world) millions of years ago, a thick layer of salt that can be thousands of feet deep was deposited by desiccation of sea water. Layers of sediment were deposited and compacted on top of the salt. Unlike sedimentary layers, salt behaves more like a fluid than a solid, changing its shape in response to surrounding sediment deposits and creating complicated fluid-like geometries. The salt present in the subsurface of the Gulf of Mexico has the appearance of solidified lava, with irregular structures of varying depth, as shown in FIG. 1. Also, unlike most sedimentary layers, which become denser with depth, salt maintains a nearly constant density at any depth. Accurate salt geometry definitions are needed for imaging sedimentary layers beneath salt.

Lately, with increasing speed and complexity of the computing resources, the imaging of geological structures under salt based on data acquired using seismic methods has become possible. Reverse-Time Migration (or RTM), which handles complex wave propagations in any direction without dip limitation, is now the standard imaging algorithm in seismic exploration. Conventional RTM salt model building is a top-down approach which consists of various steps of migration and interpretation: sediment-flood RTM and picking the top of salt (TOS), salt-flood RTM and picking the base of salt (BOS), and overhang RTM and interpretation as needed. However, in areas with complex salt geometry, such as a narrow mini-basin, the conventional approach may not be conducive to a correct salt body interpretation and can lead to poor images of formations under the salt.

Wave-fields undergo strong distortion when they propagate through the salt. Furthermore, in narrow mini-basins, the propagating wave-field becomes more complex due to multiple bounces at the sediment/salt interfaces. Ray-based migration cannot handle geological complexities, and one-way wave equation migration cannot properly handle turning and prismatic waves (i.e., waves that reflect at least twice before reaching the receiver). Although RTM provides a natural way to image prismatic waves, imaging salt surfaces around narrow mini-basin areas (i.e., deep "valleys" of sediment surrounded by the salt) can be quite difficult and ambiguous with conventional top-down salt model building. For example, FIG. 2 illustrates an image of formation layers underneath line A-A1 in FIG. 1, using conventional seismic data processing. The regions 210, 220, 230 and 240 in FIG. 2 emphasize fuzzy portions of the image due to ambiguous imaging of narrow mini-basins.

Therefore, more accurate methods for reconstructing shapes of salt based on seismic data are desirable.

SUMMARY

Various embodiments disclose methods for processing seismic data to obtain enhanced images of formations under salt and more accurate description of the salt's shape.

According to an exemplary embodiment, there is a method for processing seismic data by a computer. The method includes selecting well-imaged areas of a sediment-to-salt interface. The method further includes performing (1) a dual-flood reverse-time migration (RTM) with prismatic waves to identify new areas of the sediment-to-salt interface, the new areas being outside the well-imaged areas, and (2) an RTM to identify other new areas of the sediment-to-salt interface or of a salt-to-sediment interface.

According to another exemplary embodiment, there is a computer-readable medium non-transitory storing executable codes that, when executed on a computer, make the computer perform a method for processing seismic data. The method includes selecting well-imaged areas of a sediment-to-salt interface. The method further includes performing (1) a dual-flood reverse-time migration (RTM) with prismatic waves to identify new areas of the sediment-to-salt interface, the new areas being outside the well-imaged areas, and (2) an RTM to identify other new areas of the sediment-to-salt interface or of a salt-to-sediment interface.

According to another exemplary embodiment, there is an apparatus for processing seismic data. The apparatus includes a data interface configured to receive the seismic data and to output image data. The apparatus further includes a data processing unit that is connected to the interface. The data processing unit is configured to select well-imaged areas of a sediment-to-salt interface and to process the seismic data using (1) a dual-flood RTM with prismatic waves to identify new areas of the sediment-to-salt interface, the new areas being outside the well-imaged areas, and (2) an RTM to identify other new areas of the sediment-to-salt interface or of a salt-to-sediment interface.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments describe a step-by-step processing of seismic data to identify sediment-to-salt and salt-to-sediment interfaces using a dual-flood RTM with prismatic waves. However, the embodiments to be discussed next are not limited to seismic data and salt, but may be applied to other reflected waves (such as electromagnetic waves) reflected by interfaces between layers of a formation, when there are materials having reflection coefficients behaving similarly to salt and sedimentary layers relative to seismic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the following discussion, the terms "sediment-to-salt interface," and "salt-to-sediment interface" may be used instead of the terms of the art, "top of salt" (TOS) and "bottom of salt" (BOS). It should also be understood that the term "salt" refers to a salt body, not to a composition thereof.

Figure 1:
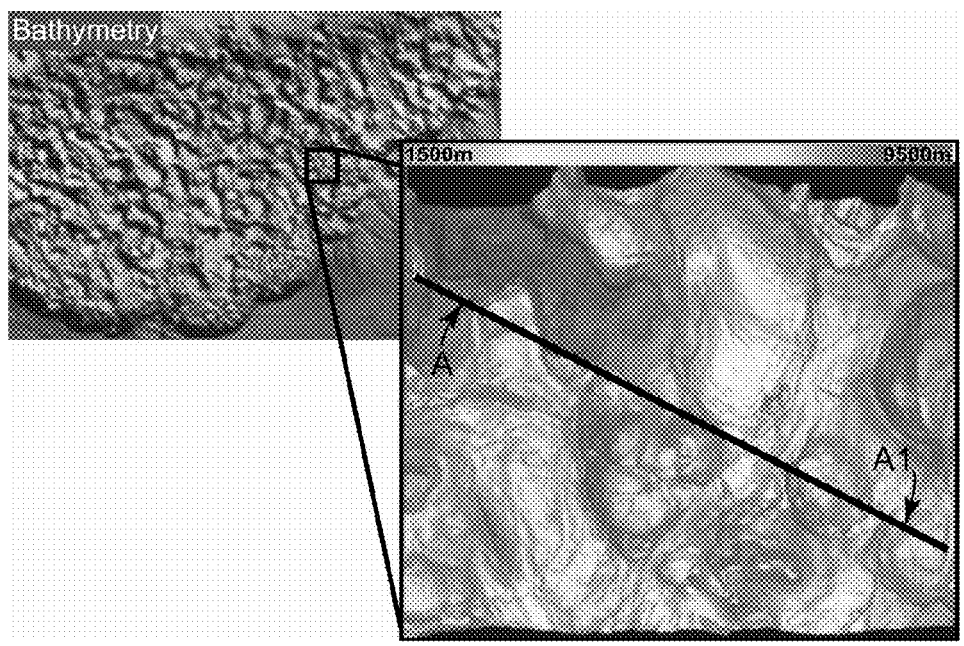
FIG. 1 is an image of the bottom of the GOM illustrating salt structures.
Figure 2:
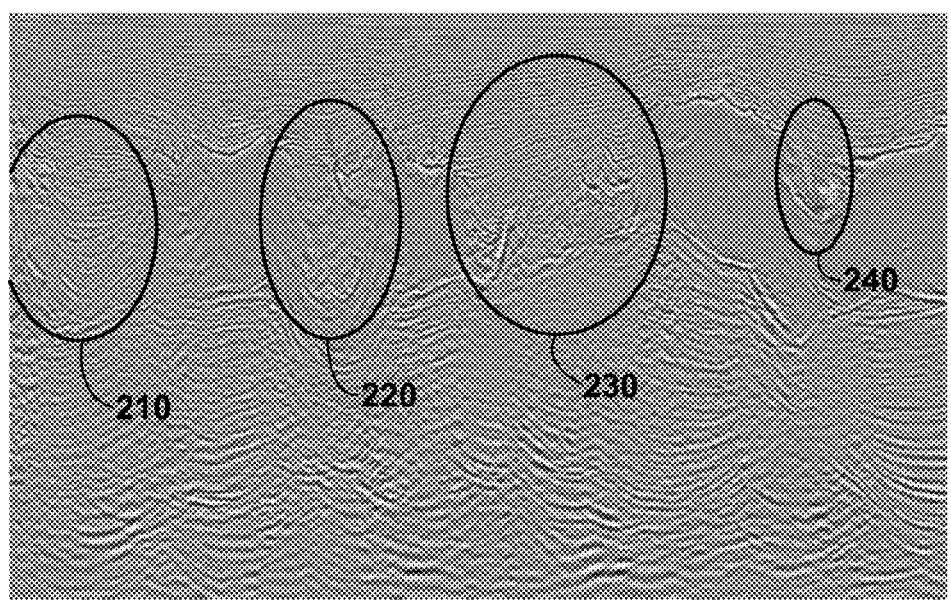
FIG. 2 is an image of a cross-section through a formation including salt, the imaged being obtained using conventional seismic data processing.
Figure 3:
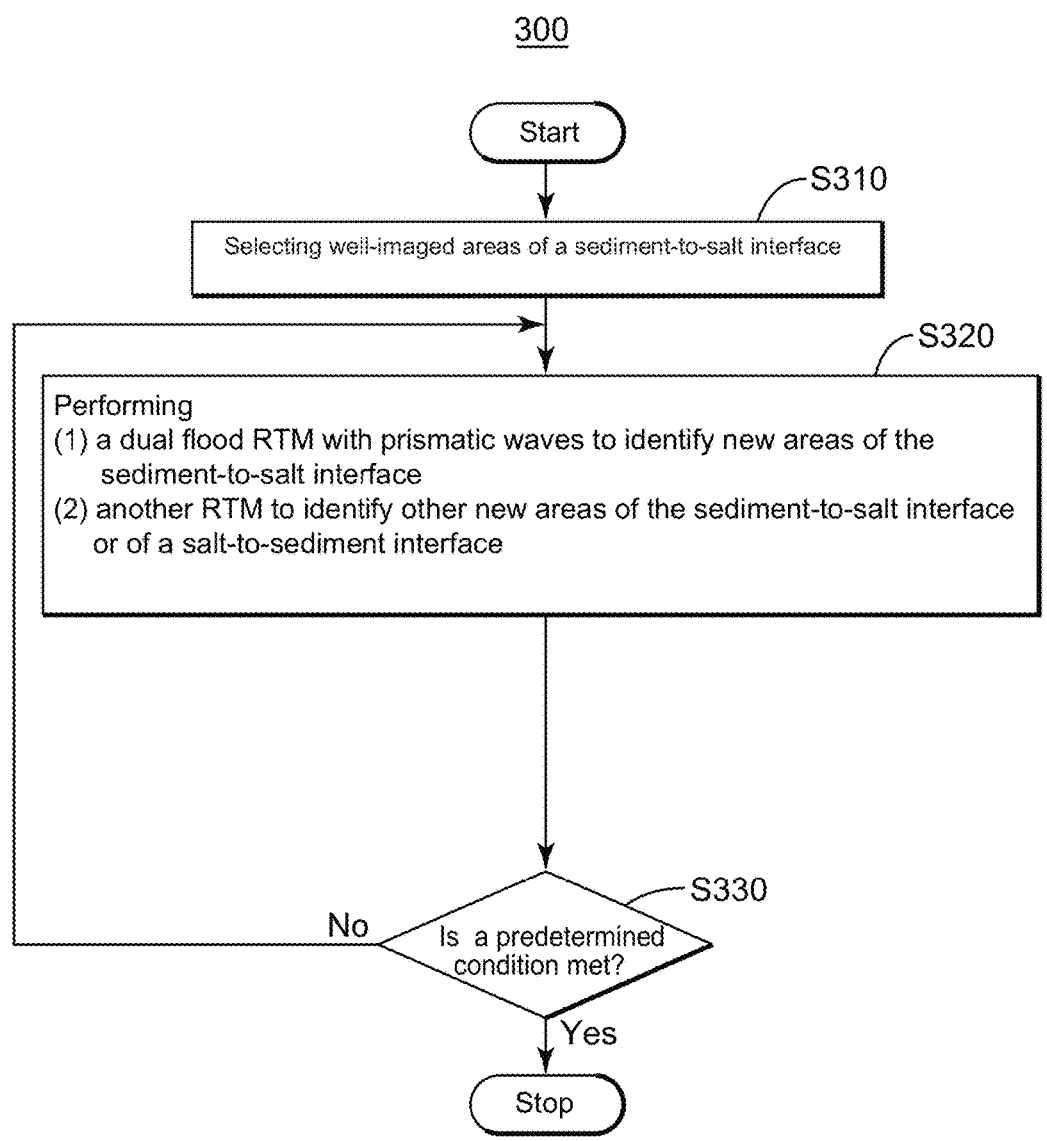
FIG. 3 is a flow diagram of a method for processing seismic data, according to an exemplary embodiment.

FIG. 3 illustrates a flow diagram of a method 300 for reconstructing the shape of salt based on seismic data according to an exemplary embodiment. The method 300 includes selecting well-imaged areas of a sediment-to-salt interface (i.e., the top surface of the salt body), at S310. The well-imaged areas of the sediment-to-salt interface may be selected in an image obtained after applying sediment flood RTM to the seismic data. The sediment-flood RTM is known to operate under the assumption that the formation consists of sedimentary layers only (i.e., no salt) to determine interfaces between sedimentary layers. One definition of the term "well-imaged" may be when a continuous interface between the salt and neighbouring sedimentary layers can be reconstructed based on the seismic data, but this definition is not exclusive. Usually, interfaces between sedimentary layers are "well-imaged," but portions of the interfaces between sedimentary layers and the salt are not "well-well imaged" when reconstructed using conventional top-to-bottom data processing.

Method 300 further includes, at S320, performing (1) a dual-flood RTM with prismatic waves applied to the seismic data to identify new areas of the sediment-to-salt interface (the new areas being outside the well-imaged areas), and (2) an RTM applied to the seismic data to determine new areas of the sediment-to-salt interface or of a salt-to-sediment interface (e.g., the bottom surface of the salt body). Step S320 may be performed repeatedly until a predetermined condition is met. Whether the predetermined condition is met is tested at S330.

In one embodiment, the predetermined condition is that the new areas together with the well-imaged areas continuously define the sediment-to-salt interface. In another embodiment, the predetermined condition may be to meet a predetermined criterion related to the quality of the image of the formation under the sediment-to-salt interface. Yet in another embodiment, the predetermined condition may require (A) the new areas together with the well-imaged areas to continuously define the sediment-to-salt interface and (B) to meet a predetermined criterion related to the quality of the image of the formation under the sediment-to-salt interface.

Figure 4:
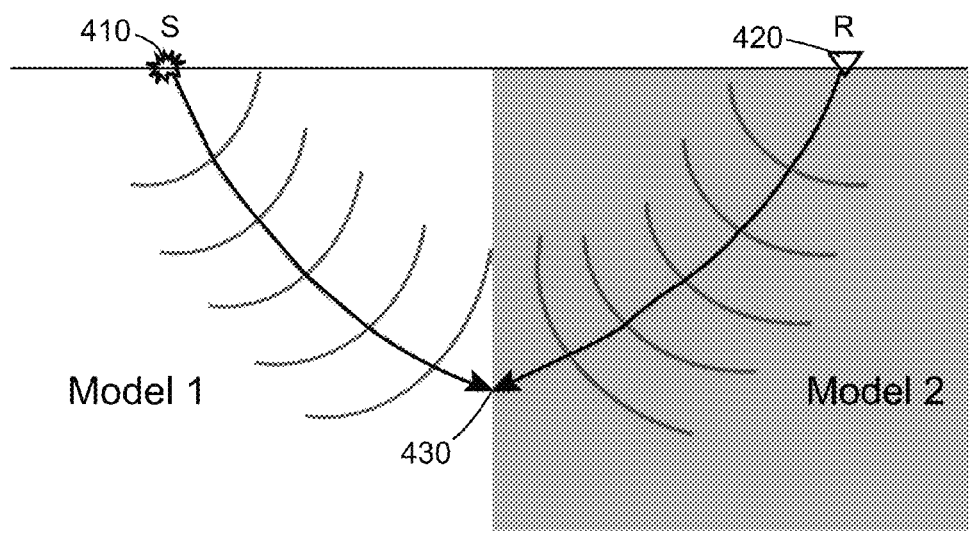
FIG. 4 is a schematic diagram illustrating the dual-flood RTM.

Dual-flood RTM is a method of reconstructing trajectories of seismic waves (i.e., floods) using a first velocity model from a source to an intersection point (e.g., on a new area of the top surface) and a second velocity model (different from the first velocity model) from a receiver to the intersection point. The two floods intersect because the seismic wave generated by the source is detected by the receiver. The dual-flood RTM is illustrated in FIG. 4. The first velocity model is used for the first-flood RTM from the source 410 to the intersection point 430. The second velocity model is used for the second-flood RTM from the receiver 420 to the intersection point 430. The intersection point 430 is likely located on or nearby a reflective interface, such as the sediment-to-salt interface (i.e., the top surface of the salt). Although in FIG. 4 the left side is shown using one background shade and the right side is shown using another background shade, the difference corresponds to the floods and not to the physical location of the trajectory (i.e., different velocity models may be used inside the same volume).

Figure 5:
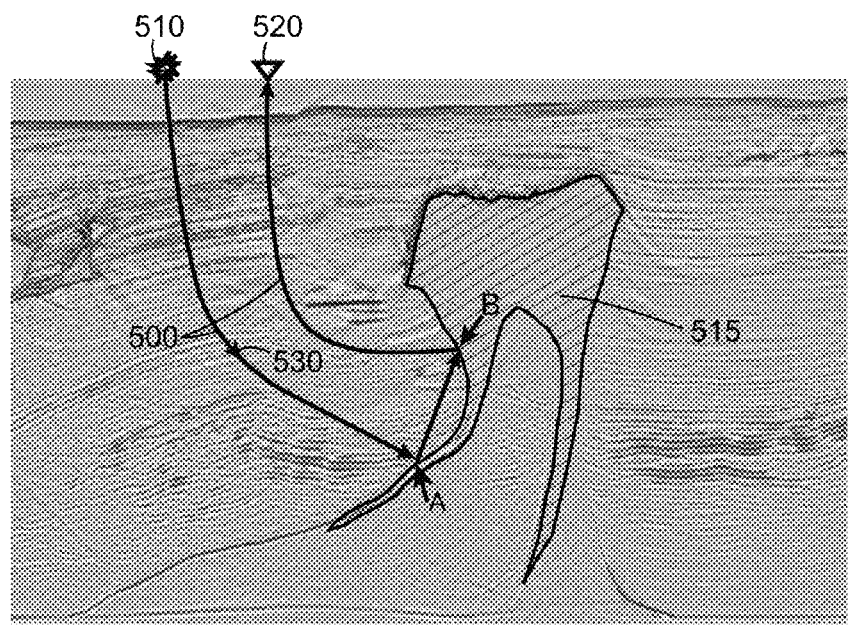
FIG. 5 is a schematic diagram illustrating a prismatic wave reflecting on the salt.

At step 320, prismatic waves are used in addition to the dual-flood RTM. A prismatic wave is one that suffers at least two reflections between the source and the receiver and may carry information about new areas of the sediment-to-salt interface, which are not reached by single reflection waves. Prismatic waves are distinguished, due to their timing and energy, from waves suffering plural reflection at known surfaces such as the water bottom. For example, in FIG. 5, a seismic wave 500 generated by a source 510 penetrates through sedimentary layers being bent in the sedimentary layers 530 due to different acoustic characteristics thereof, but not being reflected until arriving at an interface between the sedimentary layers and a salt body 515. The seismic wave 500 which is reflected twice, first at point A and second at point B between the source 510 and the detector 520 is a prismatic wave.

Figure 6:
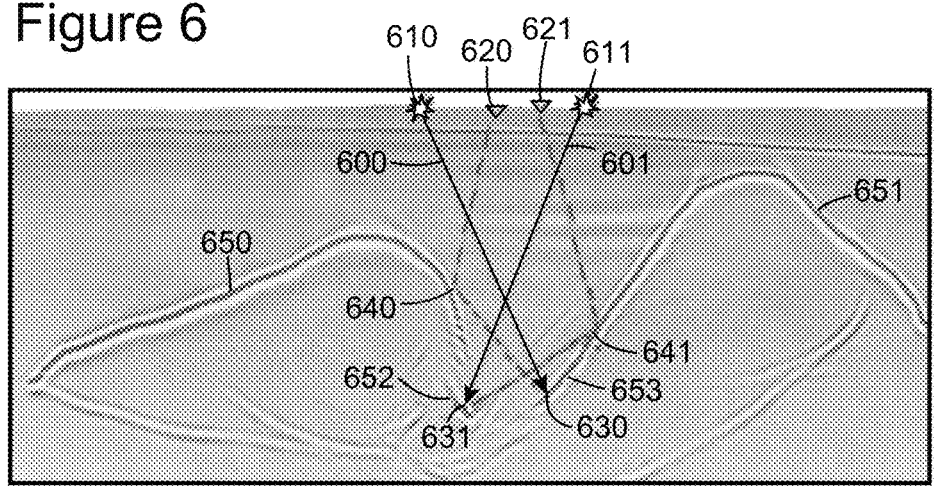
FIG. 6 is a schematic diagram illustrating two reconstructed prismatic waves.

Now using both the dual-flood RTM and the prismatic wave, FIG. 6 illustrates two waves 600 and 601, generated by sources 610 and 611, respectively. Wave 600 is a prismatic wave that suffers two reflections on the sediment-to-salt interface, at 630 and 640, before being detected by the receiver 620. Wave 601 is also a prismatic wave that suffers two reflections on the sediment-to-salt interface, at 631 and 641, before being detected by the receiver 621.

Figure 7A:
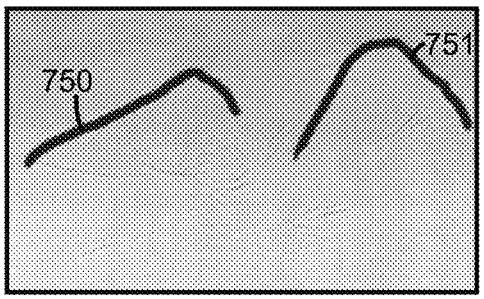
FIGS. 7A and 7B illustrate velocity models used in a dual-flood RTM, according to an exemplary embodiment.

A first velocity model illustrated in FIG. 7A is used for migration between the source 610 or 611 and the respective first reflection point 630 or 631. The first model considers that no salt is present, and, thus, sedimentary layers occupy the whole volume including the "well-imaged" areas 750 and 751 (that correspond to areas 650 and 651, respectively, in FIG. 6) of the sediment-to-salt interface. In the sedimentary layers, wave velocity varies smoothly with depth. The usage of the first velocity model is represented by the continuous parts of the prismatic waves 600 and 601 in FIG. 6.

Figure 7B:
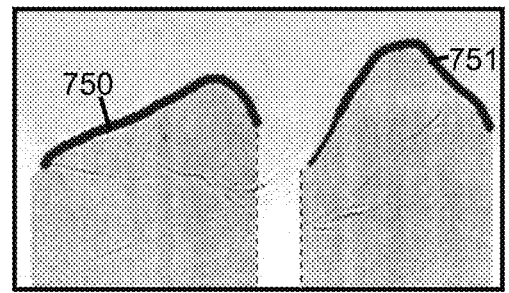

A second velocity model, as illustrated in FIG. 7B, is used for RTM between the receiver 620 or 621 and the respective second reflection point 640 or 641, as well as between the pairs (630, 640) and (631, 641) of reflection points of the same wave. The second velocity model considers that under the well-imaged areas 750 and 751 of the sediment-to-salt interface (that correspond to areas 650 and 651, respectively, in FIG. 6), there is only salt. The speed of the seismic waves in the salt is substantially different from the speed of the seismic waves in the sedimentary layer, being constant throughout the salt volume. The usage of the second velocity model is represented by dashed parts of the prismatic waves 600 and 601 in FIG. 6.

The second reflection points 640 and 641 are located on well-imaged areas 650 and 651 of the sediment-to-salt. The first reflection points 630 and 631 result from intersection of first trajectories built from the source (suffering no reflection) and second trajectories built from the receiver suffering one reflection on the well-imaged portions 650 or 651 of the sediment-to-salt interface. These intersection points 630 and 631 define new areas (such as 652 and 653) of the sediment-to-salt interface. Alternatively, first reflection points from the source to the receiver are located on well-imaged portions of the sediment-to-salt, while the second reflection points result from intersection of first trajectories built from the source (with one reflection), and second trajectories built from the receiver (with no reflection). Which model is applied on which side (i.e., whether two reflections occur from the source or from the receiver to the intersection of the floods) is subject to interpretation and determined prior to applying the method, depending on factors such as the geology of the area. In one embodiment, only the prismatic waves may be selected from the seismic data to apply the dual flood RTM.

After applying the dual-flood RTM, another RTM may be applied to identify other new areas of the sediment-to-salt interface or of the salt-to-sediment interface. This other RTM may be any of a salt-flood RTM, a sediment flood RTM, a salt-body RTM or a dual flood RTM.

The salt-flood RTM operates under the assumption that there is only salt below the well-imaged areas which may also include already identified new areas. Salt-flood RTM may also be used after the the new areas together with the well-imaged areas continuously define the sediment-to-salt interface, to identify the salt-to-sediment interface (i.e., the bottom surface of the salt body).

Figure 8:
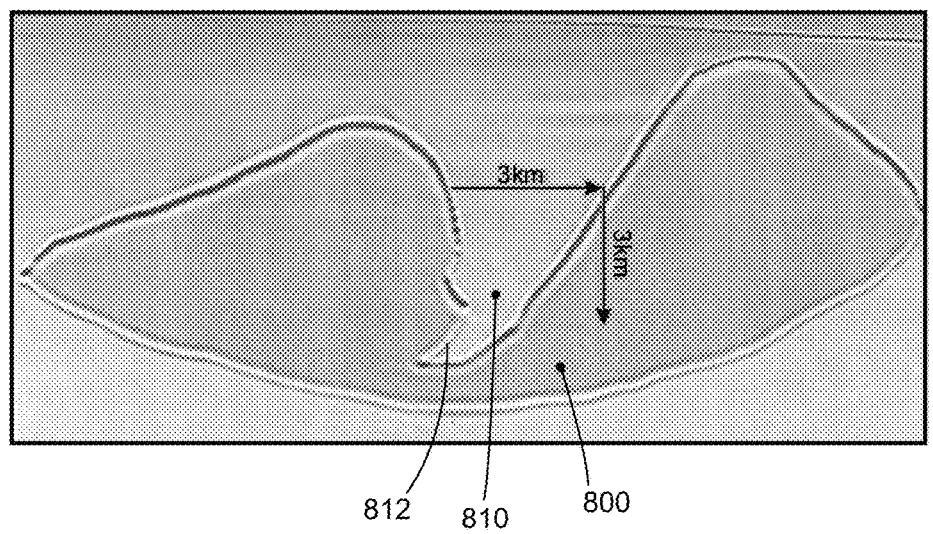
FIG. 8 is a salt body used to simulate data for comparing results obtained using a conventional method with results obtained using a method according to an exemplary embodiment.

Conventional processing and a processing according to an exemplary embodiment have been applied for simulated data related to the salt model 800 surrounded by sedimentary rock, illustrated in FIG. 8. The salt model 800 is illustrated on a cross-section and is characterized by a deep (thousands of meters) "valley" 810 (mini-basin) filled with sedimentary layers having surfaces (such as, the surface 812) that are not directly "visible" in a top-down view (i.e., cannot be reached by non-prismatic waves, detected after a single reflection).

Figure 9A:
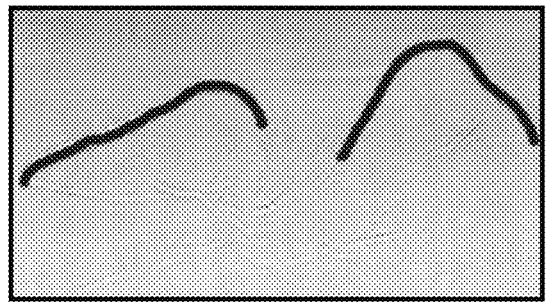
FIGS. 9A, 9B, 9C and 9D are images of the seismic data illustrating conventional seismic data processing.
Figure 9B:
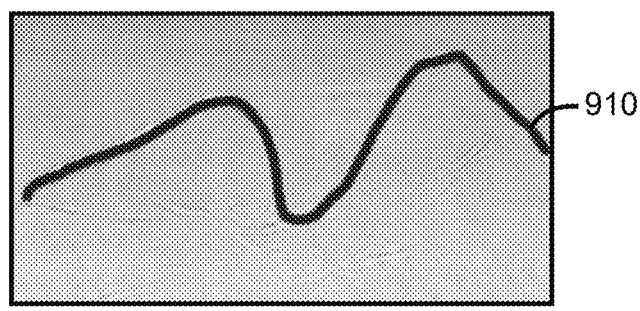
Figure 9C:
Figure 9D:
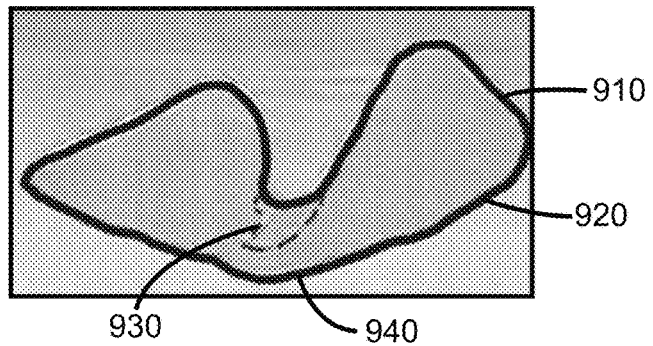

The conventional processing is a top-down model building. FIG. 9A represents an image obtained after applying a sediment-flood RTM, according to which it is assumed that there are only sedimentary layers throughout the formation. FIG. 9B shows how the sediment-to-salt interface 910 is interpolated based on the image 9A. FIG. 9C represents an image obtained after applying a salt-flood RTM to obtain the salt-to-sediment interface 920. FIG. 9D compares the shape of the salt body as derived using this conventional approach relative to the salt model. Note that portion 930 of the sediment-to-salt interface is poorly reconstructed and that portion 950 of the salt-to-sediment interface located under portion 930 is also fuzzy.

Figure 10A:
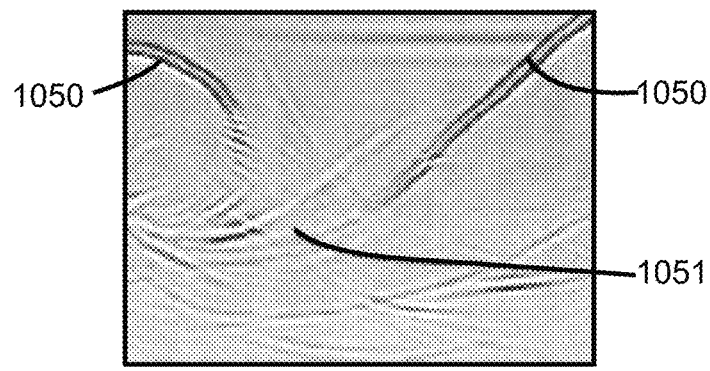
FIGS. 10A, 10B, 10C, 10D, 10E and 10F are images of the seismic data illustrating seismic data processing according to an exemplary embodiment.

In contrast, FIGS. 10A-10E illustrate a processing according to an exemplary embodiment as applied to the salt model. FIG. 10A is an image obtained using sediment-flood RTM, in which areas 1050 where the sediment-to-salt interface are well-imaged may be identified. In contrast, a portion 1051 of the sediment-to-salt interface is not well-defined.

Figure 10B:
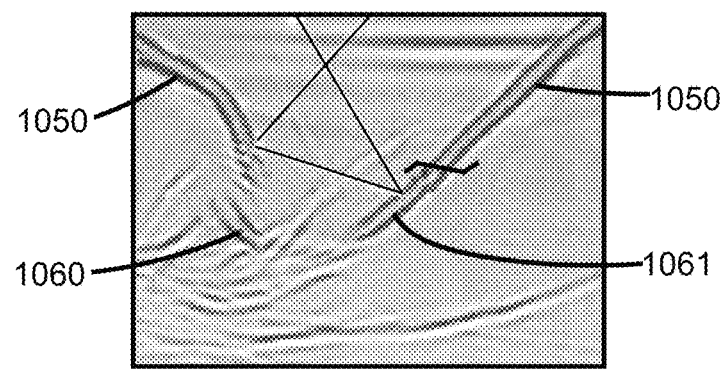
Figure 10C:
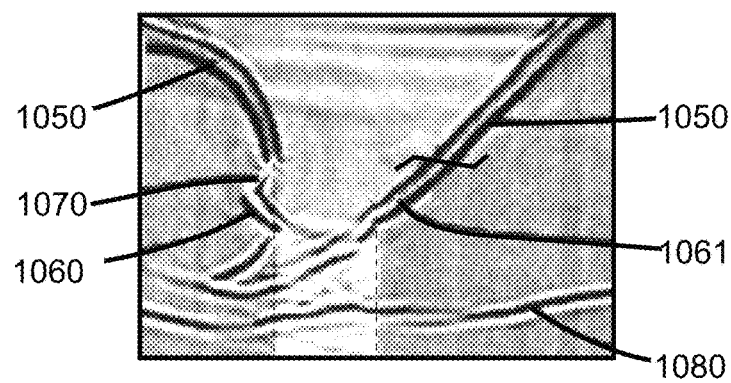

Using a dual-flood RTM with prismatic waves as discussed relative to the method illustrated in FIG. 3, new areas 1060 and 1061 of the sediment-to-salt interface are then identified as illustrated in FIG. 10B. The new areas 1060 and 1061 are the locus of the intersections of trajectories determined using different velocity models from the source (not shown in FIG. 10B, but see, e.g., 610 and 611 in FIG. 6) and from the receiver (not shown in FIG. 10B, but see, e.g., 620 and 621 in FIG. 6) after first reflecting on the well-imaged areas 1050 of the sediment-to-salt interface.

Figure 10D:
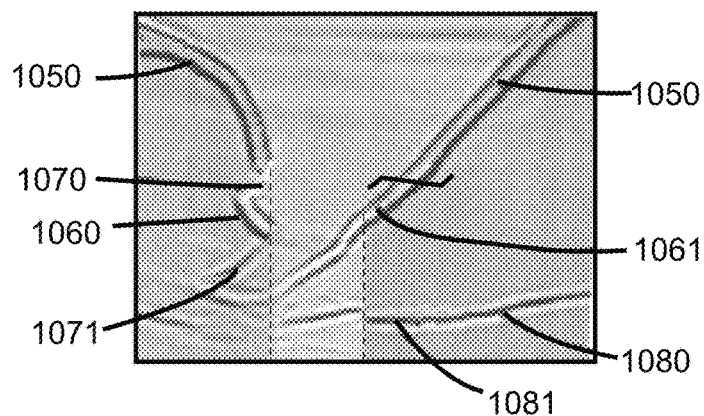

A salt-flood RTM is then applied to the seismic data, taking into consideration the well-imaged areas 1050 and the new areas 1060 and 1061, as illustrated in FIG. 100. The salt-flood RTM operates under the assumption that there is only salt under areas 1050, 1060 and 1061 of the sediment-to-salt interface. Areas of the salt-to-sediment interface, such as, 1070 and 1081 (which extends the known, well-defined bottom surface 1080) are determined as a result of applying the salt-flood RTM. Depending on the geometry, the salt-flood RTM may be applied a second time, as illustrated in FIG. 10D, to determine another area of the salt-to-sediment interface, 1071.

Figure 10E:
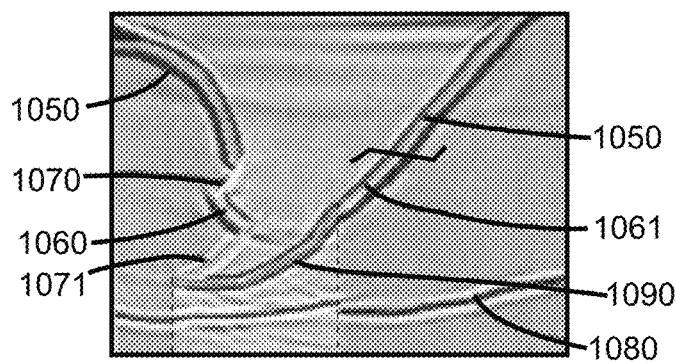
Figure 10F:
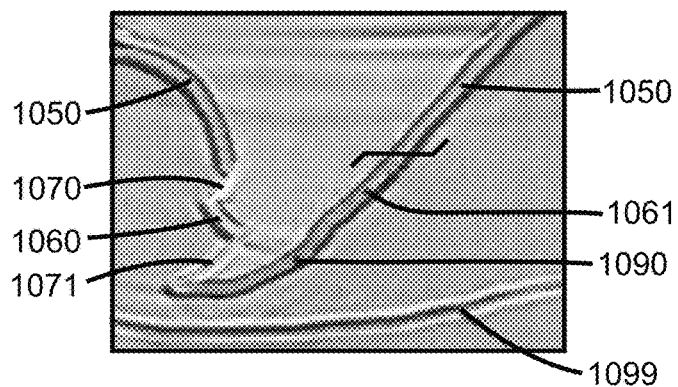

The dual-flood RTM with prismatic waves is then applied again to determine a new area 1090, thereby completely defining the sediment-to-salt interface as illustrated in FIG. 10E.

As illustrated in FIG. 10 F, the salt-to-sediment interface 1099 is finally completely defined by applying salt-flood RTM when taking into consideration the completely defined sediment-to-salt interface. FIG. 10F represents the shape of the salt with sediment-to-salt and salt-to-sediment interfaces continuously well-imaged.

Figure 11A:
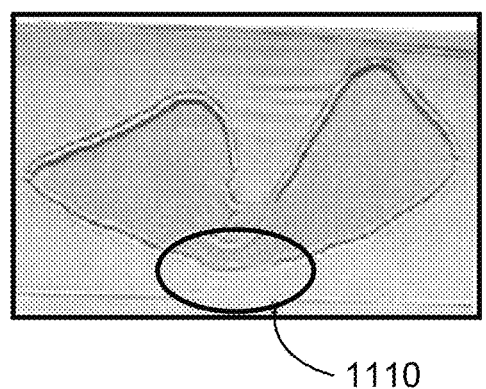
FIGS. 11A and 11B illustrate results obtained using the conventional method, and results obtained using the method according to an exemplary embodiment, respectively.
Figure 11B:
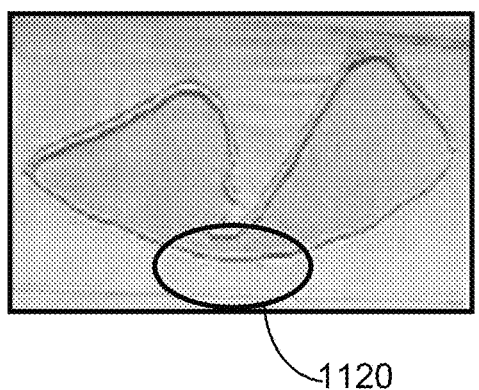

FIG. 11A illustrates an image of the formation obtained after processing the simulated seismic data using the conventional method, and FIG. 11B illustrates an image of the formation obtained after processing the simulated data according to an exemplary embodiment. The two methods yield substantively different results, both relative to the salt's geometry, and relative to the clarity of the image of the sedimentary layers below the salt, as emphasized in regions 1110 and 1120 of FIGS. 11A and 11B, respectively.

Figure 12:
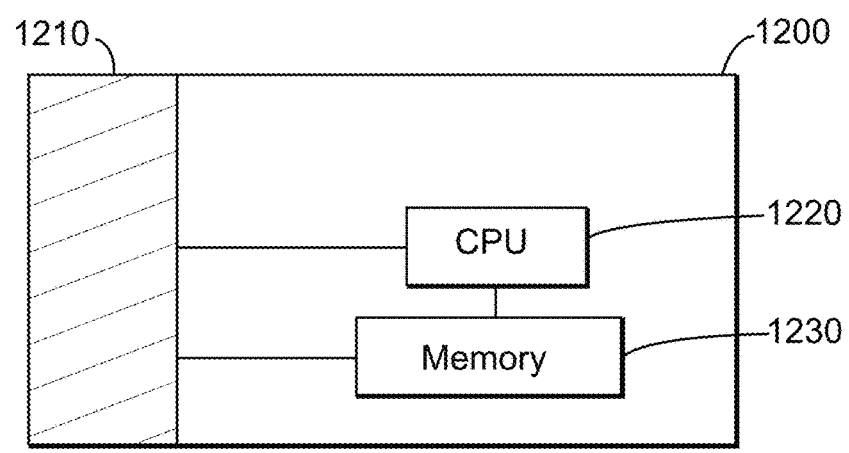
FIG. 12 is a schematic diagram of an apparatus for processing seismic data according to an exemplary embodiment.

FIG. 12 illustrates a schematic diagram of an apparatus 1200 for processing seismic data. The apparatus 1200 includes a data interface 1210 configured to receive seismic data and to output image data, and a data processing unit 1220 connected to the interface. The data processing unit 1220 is configured to select well-imaged areas of a sediment-to-salt interface and to process the seismic data to identify the sediment-to-salt interface (i.e., top surface of the salt body) and the salt-to-sediment interface (i.e., the bottom surface of the salt body). The apparatus 1200 may further include a memory 1230 capable of storing data and executable codes that would make the data processing unit 1220 execute a method similar to method 300.

The data processing unit 1220 may use (1) a dual-flood RTM with a prismatic waves to identify new areas of the sediment-to-salt interface, the new areas being outside the well-imaged areas, and (2) an RTM to identify other new areas of the sediment-to-salt interface or of a salt-to-sediment interface.

The results obtained using the conventional method and exemplary embodiments have been applied to seismic data acquired at a location in Green Canyon, GOM, and at a location in Walker Ridge, GOM. Substantial improvement has been observed both in determining the shape of the respective salt bodies, and relative to the clarity of images of the sedimentary layers beneath the salt.

The disclosed exemplary embodiments provide a method, an apparatus and a computer-readable medium for reconstructing the shape (i.e., the sediment-to-salt interface and the salt-to-sediment interface) of a salt basin from seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data acquired to explore an underground formation including a salt body, by a computer, the method comprising:
    selecting well-imaged areas of a sediment-to-salt interface from an initial model of the underground formation including an image of the salt body obtained from the seismic data;
    performing
        (1) a dual-flood reverse-time migration (RTM) with prismatic waves to identify new areas of the sediment-to-salt interface, the new areas being outside the well-imaged areas, and
        (2) an RTM to identify other new areas of the sediment-to-salt interface or of a salt-to-sediment interface; and
    generating an updated model of the underground formation including an updated image of the salt body using the new areas of the sediment-to-salt interface and the other new areas of the sediment-to-salt interface or of a salt-to-sediment interface,
    wherein the well-imaged areas of the sediment-to-salt interface are identified by performing a sediment dual-flood RTM, and the dual-flood RTM with prismatic waves considers at least two reflections, one of which is on the well-imaged areas.

2. The method of claim 1, the initial model is obtained by applying sediment flood RTM to the seismic data.

3. The method of claim 1, wherein the RTM is performed repeatedly until the new areas together with the well-imaged areas continuously define the sediment-to-salt interface.

4. The method of claim 1, wherein the RTM is performed repeatedly until a predetermined criterion related to quality of image of a formation under the sediment-to-salt interface is met.

5. The method of claim 1, wherein the RTM is any of a salt-flood RTM, a sediment flood RTM, a salt-body RTM or a dual flood RTM.

6. The method of claim 1, wherein, for the dual-flood RTM with prismatic waves, a first velocity model is used for calculating a first flood, the first velocity model assuming that seismic waves travel only through sedimentary layers, and
    a second velocity model is used for calculating a second flood, the second velocity model assuming that there is only salt under the well-imaged areas of the sediment-to-salt interface on which the second flood is reflected before intersecting the first flood,
    wherein the first flood and the second flood start one from a source and one from a receiver of seismic waves that cause the seismic data.

7. The method of claim 1, wherein the prismatic waves are reflected twice between a source and a receiver, being once reflected on the well-imaged areas of a sediment-to-salt interface.

8. A computer-readable medium non-transitory storing executable codes, which, when executed on a computer, make the computer perform a method for processing seismic data acquired to explore an underground formation including a salt body, the method comprising:
    selecting well-imaged areas of a sediment-to-salt interface from an initial model of the underground formation including an image of the salt body obtained from the seismic data;
    performing
        (1) a dual-flood reverse-time migration (RTM) with prismatic waves to identify new areas of the sediment-to-salt interface, the new areas being outside the well-imaged areas, and
        (2) an RTM to identify other new areas of the sediment-to-salt interface or of a salt-to-sediment interface; and
    generating an updated model of the underground formation including an updated image of the salt body using the new areas of the sediment-to-salt interface and the other new areas of the sediment-to-salt interface or of a salt-to-sediment interface,
    wherein the well-imaged areas of the sediment-to-salt interface are identified by performing a sediment-only dual-flood RTM, and the dual-flood RTM with prismatic waves considers at least two reflections, one of which is on the well-imaged areas.

9. The computer-readable medium of claim 8, wherein the initial model is obtained by applying sediment flood RTM to the seismic data.

10. The computer-readable medium of claim 8, wherein the RTM is performed repeatedly until the new areas together with the well-imaged areas continuously define the sediment-to-salt interface.

11. The computer-readable medium of claim 8, wherein the RTM is performed repeatedly until a predetermined criterion related to quality of image of a formation under the salt-to-sediment interface is met.

12. The computer-readable medium of claim 8, wherein the RTM is any of a salt-flood RTM, a sediment flood RTM, a salt-body RTM or a dual flood RTM.

13. The computer-readable medium of claim 8, wherein a first velocity model is used for calculating a first flood, the first model assuming that seismic waves travel only through sedimentary layers, and a second velocity model is used for performing a second flood, the second velocity model assuming that there is only salt under the well-imaged areas of the sediment-to-salt interface on which the second flood is reflected before intersecting the first flood, wherein the first flood and the second flood start one from a source and one from a receiver of seismic waves that cause the seismic data.

14. The computer-readable medium of claim 8, wherein the prismatic waves are reflected twice between a source and a receiver, once being reflected on the well-imaged areas of the sediment-to-salt interface.

15. An apparatus for processing seismic data, the apparatus comprising:
- a data interface configured to receive the seismic data and to output image data; and
- a data processing unit connected to the interface and configured
  - to select well-imaged areas of a sediment-to-salt interface from an initial model of the underground formation including an image of the salt body obtained from the seismic data;
  - to perform (1) a dual-flood reverse-time migration (RTM) with prismatic waves to identify new areas of the sediment-to-salt interface, the new areas being outside the well-imaged areas, and (2) an RTM to identify other new areas of the sediment-to-salt interface or of a salt-to-sediment interface; and
  - to generate an updated model of the underground formation including an updated image of the salt body using the new areas of the sediment-to-salt interface and the other new areas of the sediment-to-salt interface or of a salt-to-sediment interface, wherein the well-imaged areas of the sediment-to-salt interface are identified by performing a sediment-only dual-flood RTM, and the dual-flood RTM with prismatic waves considers at least two reflections, one of which is on the well-imaged areas.

16. The apparatus of claim 15, wherein the data processing unit obtains the initial model by applying sediment flood RTM to the seismic data.

17. The apparatus of claim 15, wherein the data processing unit performs the RTM repeatedly until the new areas together with the well-imaged areas continuously define the sediment-to-salt interface.

18. The apparatus of claim 15, wherein the RTM is any of a salt-flood RTM, a sediment flood RTM, a salt-body RTM or a dual flood RTM.

19. The apparatus of claim 15, wherein the data processing unit uses
- a first velocity model for calculating a first flood, the first model assuming that seismic waves travel only through sedimentary layers, and
- a second velocity model for calculating a second flood RTM, the second velocity model assuming that there is only salt under the well-imaged areas of the sediment-to-salt interface on which the second flood is reflected, wherein the first flood and the second flood start one from a source and one from a receiver of seismic waves that cause the seismic data.

20. The apparatus of claim 15, wherein the data processing unit reconstructs the prismatic waves assuming that the waves are reflected twice between a source and a receiver, being once reflected on the well-imaged areas of the sediment-to-salt interface.

* * * * *